United States Patent
Suwa

(10) Patent No.: US 8,615,129 B2
(45) Date of Patent: Dec. 24, 2013

(54) PATTERN SEPARATING EXTRACTION DEVICE, AND PATTERN SEPARATING EXTRACTION METHOD

(75) Inventor: Misako Suwa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1251 days.

(21) Appl. No.: 12/004,798

(22) Filed: Dec. 21, 2007

(65) Prior Publication Data

US 2008/0175483 A1 Jul. 24, 2008

(30) Foreign Application Priority Data

Jan. 18, 2007 (JP) ................................ 2007-008643

(51) Int. Cl.
*G06K 9/00* (2006.01)

(52) U.S. Cl.
USPC ........... 382/162; 382/164; 382/166; 382/190; 358/496; 358/498

(58) Field of Classification Search
USPC ......... 382/225, 186, 187, 209, 118, 155, 174, 382/254, 275, 285, 286, 190, 181, 189, 310, 382/311, 171, 304, 202, 306, 199, 176, 173, 382/180, 309, 270, 272, 232, 175, 159, 217, 382/195, 198, 206, 218, 278, 237, 167, 282, 382/166, 164, 170, 224, 168, 162, 154; 355/407, 408, 47; 385/496, 498, 462, 385/464, 2.99, 1.18, 2.1, 3.02, 539, 1.9
See application file for complete search history.

(56) References Cited

U.S. PATENT DOCUMENTS

| | | | | | |
|---|---|---|---|---|---|
| 5,920,644 | A | * | 7/1999 | Fujimoto et al. | 382/159 |
| 6,832,002 | B2 | * | 12/2004 | Baatz et al. | 382/173 |
| 6,850,645 | B2 | * | 2/2005 | Naoi et al. | 382/190 |
| 7,729,025 | B2 | * | 6/2010 | Eguchi et al. | 358/539 |
| 2001/0055421 | A1 | * | 12/2001 | Baatz et al. | 382/173 |
| 2005/0100212 | A1 | * | 5/2005 | Eguchi et al. | 382/164 |
| 2005/0201620 | A1 | * | 9/2005 | Kanamoto et al. | 382/182 |

FOREIGN PATENT DOCUMENTS

| | | |
|---|---|---|
| JP | A 9-93443 | 4/1997 |
| JP | A 2005-71134 | 3/2005 |

OTHER PUBLICATIONS

Leon Todoran and Marcel Worring, "Segmentation of Color Document Images" ISIS technical reports vol. 21, 2000, pp. 1-22 <http://www.science.uva.nl/research/reports-isis/ISISreport.html>.*

(Continued)

*Primary Examiner* — Mekonen Bekele
(74) *Attorney, Agent, or Firm* — Fujitsu Patent Center

(57) ABSTRACT

When an operator starts a pattern separation extraction tool, an input screen is displayed on the display device. The operator can choose and designate any one of document image data within the storage device through the input screen. The document image that is chosen by the operator is displayed on the display device. The operator can choose and designate a color sample by a drag operation on the document image that is displayed on the display device. If the operator inputs the designation to finish the designation of a color sample through the input device after designating some color samples, the pattern separating extraction device generates and outputs the image data that consists of one print pattern for each of the print patterns included in the document image chosen by the operator.

8 Claims, 15 Drawing Sheets

(56) References Cited

OTHER PUBLICATIONS

Figure 1:
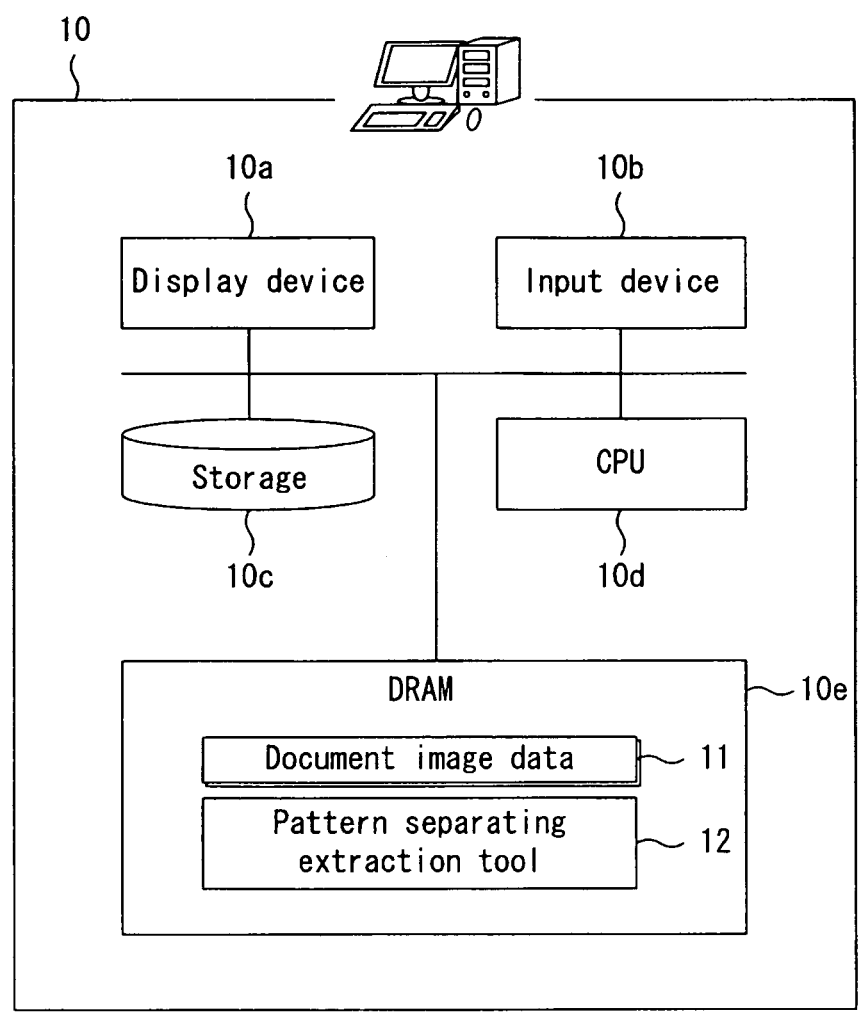

Leon Todoran, DART—Visualization and Analysis ToolVersion 1.0.1, Jun. 1999—User manual, 4 pages,<http://staff.science.uva.nl/~todoran/demo/DART-User.doc >.*

Hong-Ming Suen and Jhing-Fa Wang, "Color Document Image Segmentation for Automated Document Entry Systems", 1996 IEEE TENCON—Digital Signal Processing Applications, pp. 131-136.*

Yuan He; Jun Sun; Naoi, S.; Fujii, Y.; Fujimoto, K.; "Unsupervised Decomposition of Color Document Images by Projecting Colors to a Spherical Surface" ,The Eighth IAPR Workshop on Document Analysis Systems, 2008 IEEE, pp. 394-401.*

Leon Todoran and Marcel Worring, "Segmentation of Color Document Images" ISIS technical reports vol. 21,2000, p. 22 /www.science.uva.nl/research/reports-isis/ISISreport.html.*

Leon Todoran, DART—Visualization and Analysis ToolVersion 1.0.1, Jun. 1999—User manual, 4 pages, http://staff.science.uva.nl/~todoran/demo/DART-User.doc.*

Leon Todoran and Marcel Worring, "Segmentation of Color Document Images" ISIS technical reports vol. 21,2000, p. 22 /www.science.uva.nl/research/reports-isis/ISISreport. htmL.*

* cited by examiner

FIG. 7

| Area number | Position information | Frequency |
|---|---|---|
| 1 | (s1, t1, u1) | 1 |
| 2 | (s2, t2, u2) | 0 |
| 3 | (s3, t3, u3) | 2 |
| ⋮ | ⋮ | ⋮ |

FIG. 8

| Color sample | Direction vector | Center coordinate of unit sphere |
|---|---|---|
| 1 | (l1, m1, n1) | (x0, y0, z0) |
| 2 | (l2, m2, n2) | (x0, y0, z0) |
| 3 | (l3, m3, n3) | (x0, y0, z0) |
| ⋮ | ⋮ | ⋮ |

First color sample 11a

Second color sample 11b

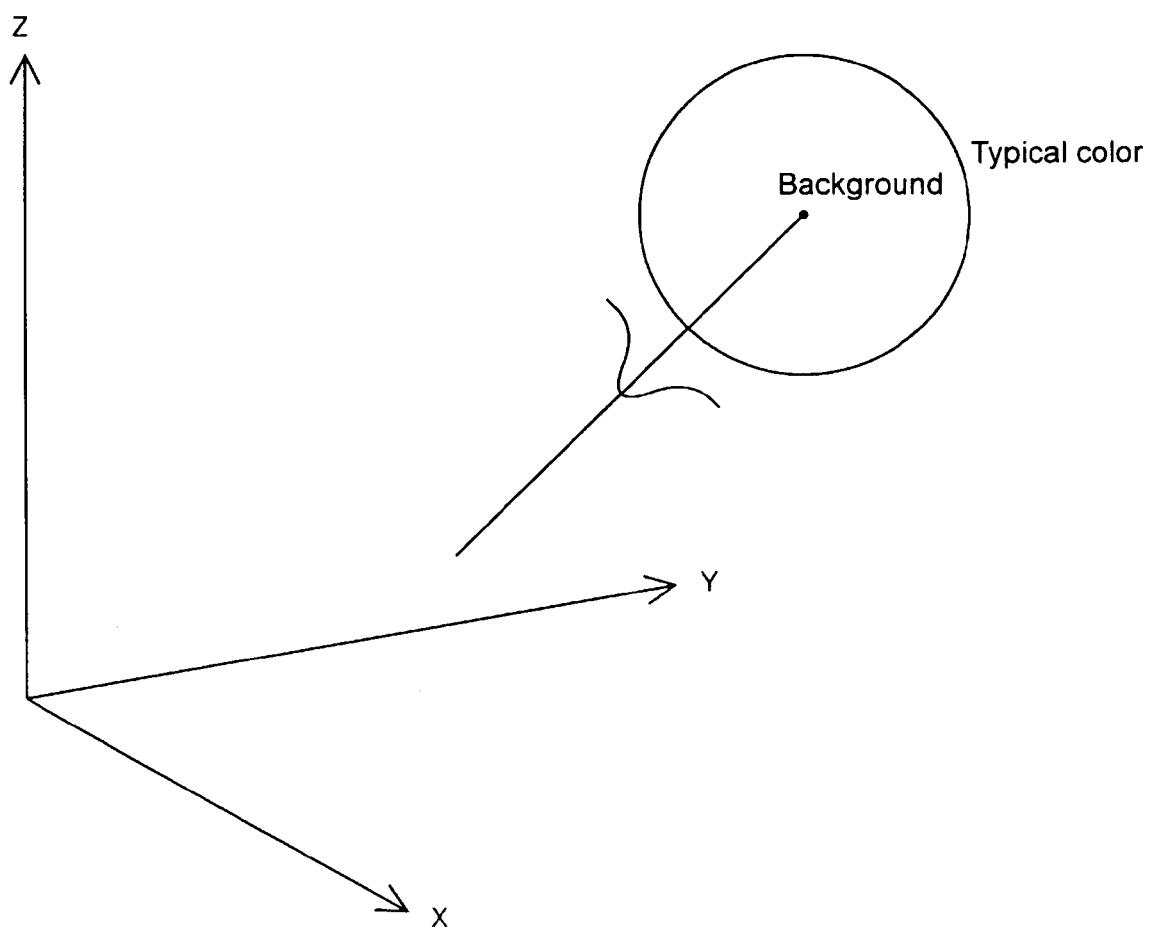

FIG. 12

| Foreground pixel number | Coordinate | Belonging degree | Belonging | Distance to approximate plane |
|---|---|---|---|---|
| 1 | (x1, y1, z1) | m11, m21 | 2 | d1 |
| 2 | (x2, y2, z2) | m12, m22 | - | d2 |
| 3 | (x3, y3, z3) | m13, m23 | 1, 2 | d3 |
| ... | ... | ... | ... | ... |

Belonging degree $m_1 = 1 - \theta_1/(\theta_1 + \theta_2)$

Belonging degree $m_2 = 1 - \theta_2/(\theta_1 + \theta_2)$

PATTERN SEPARATING EXTRACTION DEVICE, AND PATTERN SEPARATING EXTRACTION METHOD

BACKGROUND OF THE INVENTION

The present invention relates to a program, device, and method for separating and extracting any one print pattern from a plurality of print patterns that overlap mutually.

As everyone knows, a document is a piece of paper on which some entry columns are formed by ruled lines according to a predetermined format. Characters and symbols fill in the entry columns by handwriting or printing, or seals are imprinted therein. A pattern such as a handwriting character, a carbon copy character, or an imprint of a seal that is added to a document by a person is called a post print pattern. A pattern such as a ruled line, a character, or a symbol that is printed on a document before a person adds a post print pattern is called a pre-print pattern.

In recent years, contents of a document may be digitized and saved in a disk unit. Thereby, it becomes unnecessary to keep storage space for a paper text. An image data generating device such as a scanner or a digital camera, and OCR (Optical Character Reader) are required for the digitization.

The OCR means a device that generates text data by comparing a character pattern or a character feature included in a process-target image with a reference character pattern or a reference character feature, or by finding a distribution boundary in a process-target image. A certain type of the OCR is provided with a function for analyzing a layout in a process-target image to save an area that is recognized as a pattern or an imprint of a seal as image data, and a function for analyzing a configuration of a pre-print pattern by extracting a ruled line and a printing character from a process-target image to save it as vector data that can be decompressed and edited, in addition to a fundamental function for generating text data.

When such an OCR recognizes a handwriting character in a process-target image, saves an imprint of a seal as image data, or saves a pre-print pattern as vector data, overlaps of print-patterns such as a handwriting character, imprint of a seal, ruled line, and printing character have an adverse effect on processes of character recognition, layout analysis, and pre-print-pattern structural analysis. Therefore, an operator of the OCR has to separate a plurality of print patterns that overlap mutually to extract the respective patterns as a preliminary treatment of each process.

Figure 5:
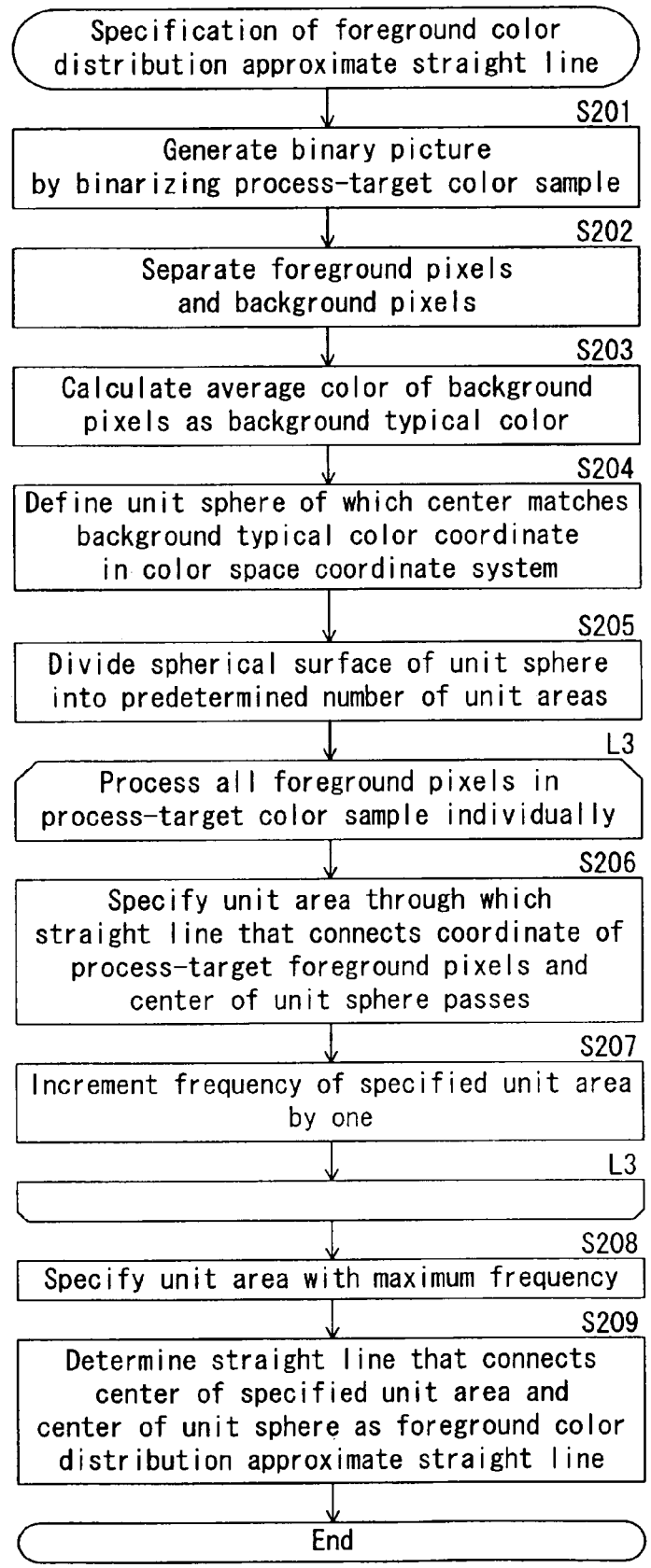

Japanese unexamined patent publication 2005-071134 (JP2005-071134A) disclose a method for separating two print patterns that overlap mutually (see paragraph 0027 and FIG. 5). The separating extraction method disclosed in the publication extracts one print pattern and removes the other print pattern using color information.

Specifically, the technique disclosed in the above-mentioned publication forms a color distribution of a ruled line and a color distribution of a handwriting character on a color space coordinate about an image of a document on which the ruled line and the handwriting character are indicated by plotting the coordinate points of the colors of the respective pixels on the color space coordinate system. Then, the technique sets up a single boundary (referred to as a threshold in the publication) that separates the color distribution of the ruled line and the color distribution of the handwriting character in the document image, and brings the brightness levels of the pixels in the side of the color distribution of the ruled line with respect to the boundary to zero. Thereby, the ruled line is removed from the document image and the handwriting character remains. If the document image from which the ruled line is removed is used, the OCR can execute the character recognition process without an influence of the ruled line section.

As mentioned above, although the technique disclosed in JP2005-071134A can extract a print pattern that consists of handwriting characters only, it cannot separate and extract a print pattern that consists of ruled lines only that are overlapped with the handwriting characters simultaneously.

Of course, if the separating extraction process is repeatedly executed for the respective print patterns that overlap mutually, an image of the print pattern that consists of characters only, an image of the print pattern that consists of ruled lines only, and an image of the other print pattern can be generated individually. However, since the iteration count for the separating extraction process must be equal to the number of the print patterns to be extracted, the operation becomes very complicated.

SUMMARY OF THE INVENTION

The present invention is developed in view of the problems of the conventional technique mentioned above. An object of the present invention is to enable extraction of each of print patterns individually from a document image.

A pattern separating extraction program of the present invention is developed to achieve the above-mentioned object. The program makes a computer execute functions including: a displaying function for displaying a document image that includes a plurality of print patterns that consist of one post print pattern and one or more post print pattern and/or one or more pre-print pattern on a display device; an acceptance function for accepting a section that consists of the ground color and a color of one of the print patterns in the document image displayed by the displaying function as a color sample for each of the print patterns through an input device; an approximate straight line specification function for specifying an approximate straight line of a distribution in the color space about a color other than the ground color for each color sample that is specified by each designation accepted by the acceptance function; a belonging degree calculation function for calculating a belonging degree of each of all the pixels in the document image to each of the print patterns based on a distance between a color of the pixel and each of the approximate straight lines that are specified by the approximate straight line specification function; a belonging target determination function for determining a print pattern as a belonging target for each of all the pixels in the document image when the belonging degree of the pixel to the print pattern exceeds a predetermined threshold; a generation function for generating image data of an image that consists of only one print pattern based on the pixels that belong to the print pattern for each of the print patterns in which the pixels belong thereto are determined by the belonging target determination function; and an output function for outputting the image data about the respective print patterns generated by the generation function.

With this configuration, the computer generates image data for each of the print patterns included in the document image. Thereby, each of the print patterns is individually extracted from the document image.

When generating the image data about the respective print patterns, the computer treats a pixel in a document image that has high belonging degrees for a plurality of print patterns as a pixel that constitutes these print patterns. That is, a pixel in a document image does not only constitute one print pattern image, but it also constitutes a plurality of print pattern images in some cases. Accordingly, each of the print pattern images generated can be used as a target of the character recognition process by the OCR without an influence of a lack of a pixel having high belonging degree, etc.

As described above, according to the present invention, each of print patterns can be individually extracted from a document image.

DESCRIPTION OF THE ACCOMPANYING DRAWINGS

Figure 2:
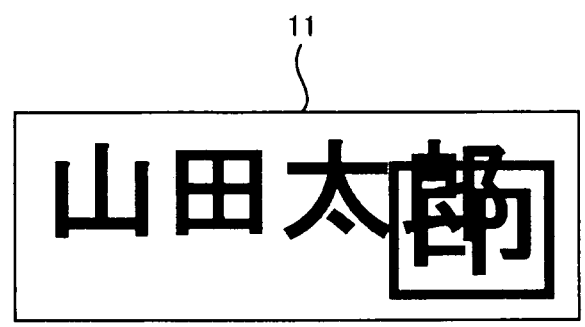
Figure 3:
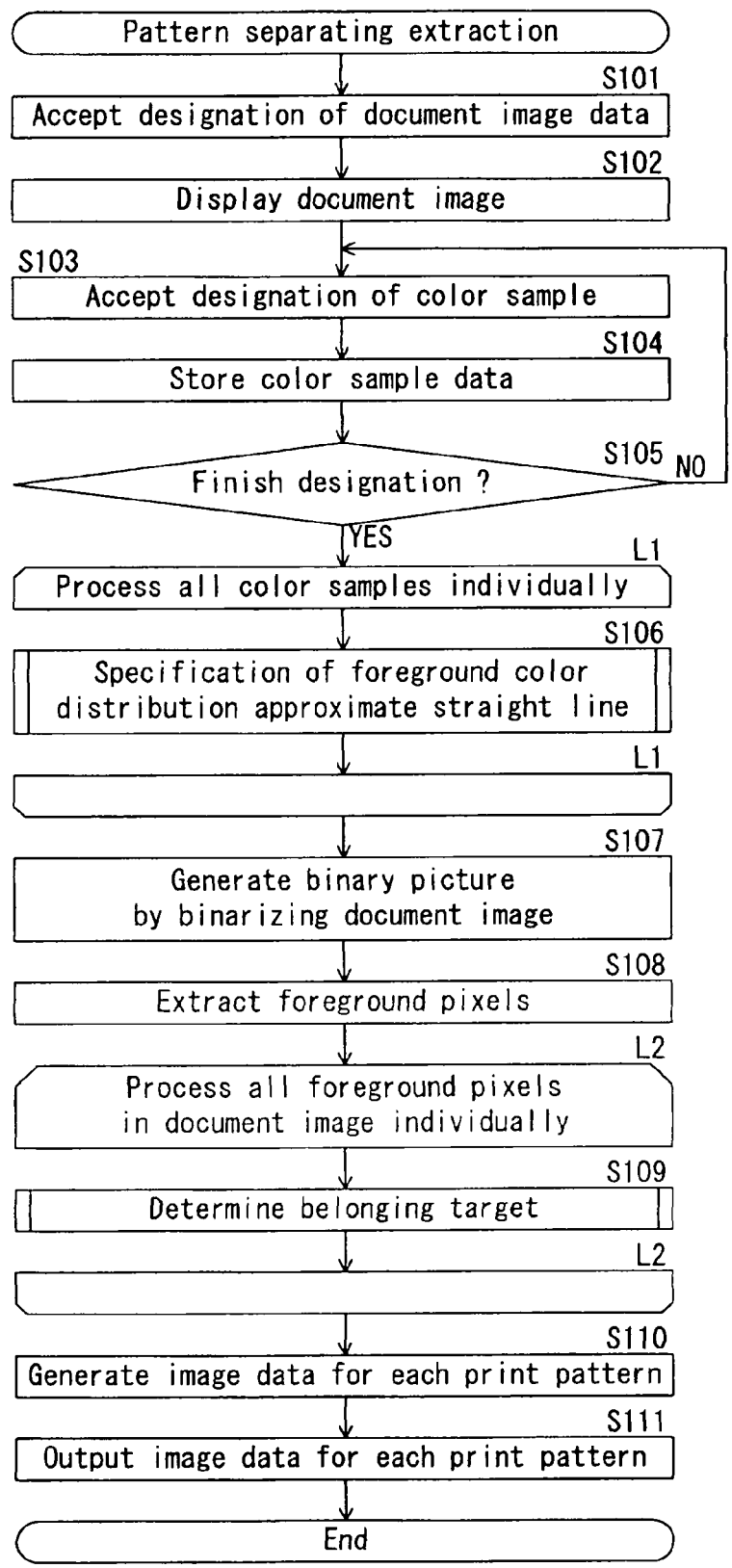
Figure 4:
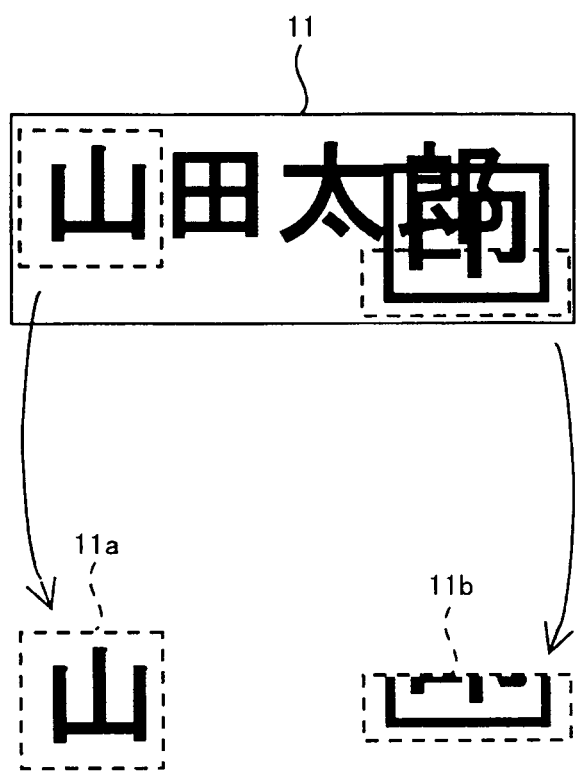
Figure 6:
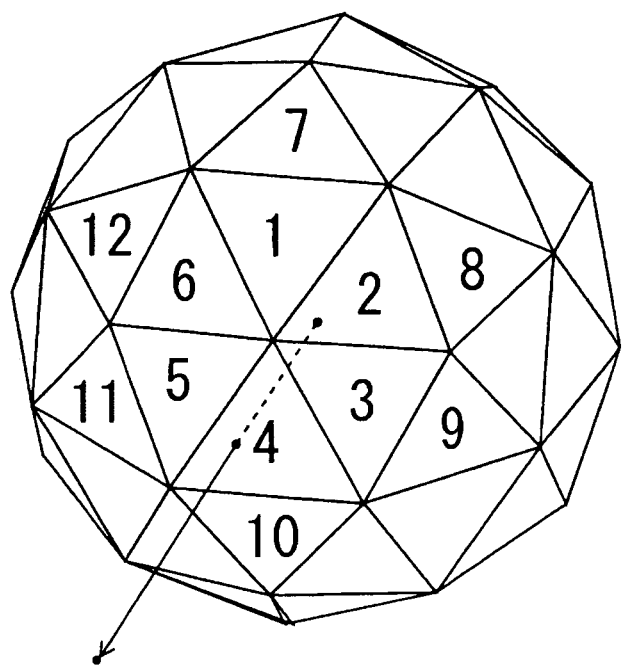
Figure 9A:
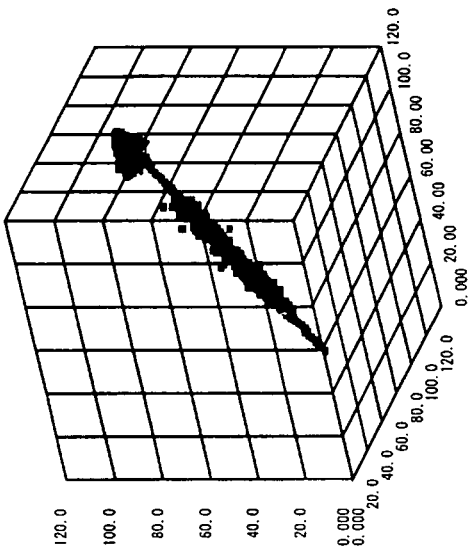
Figure 9B:
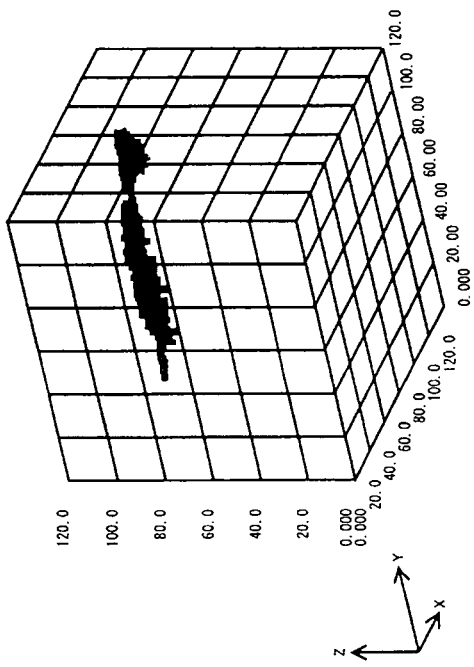
Figure 11:
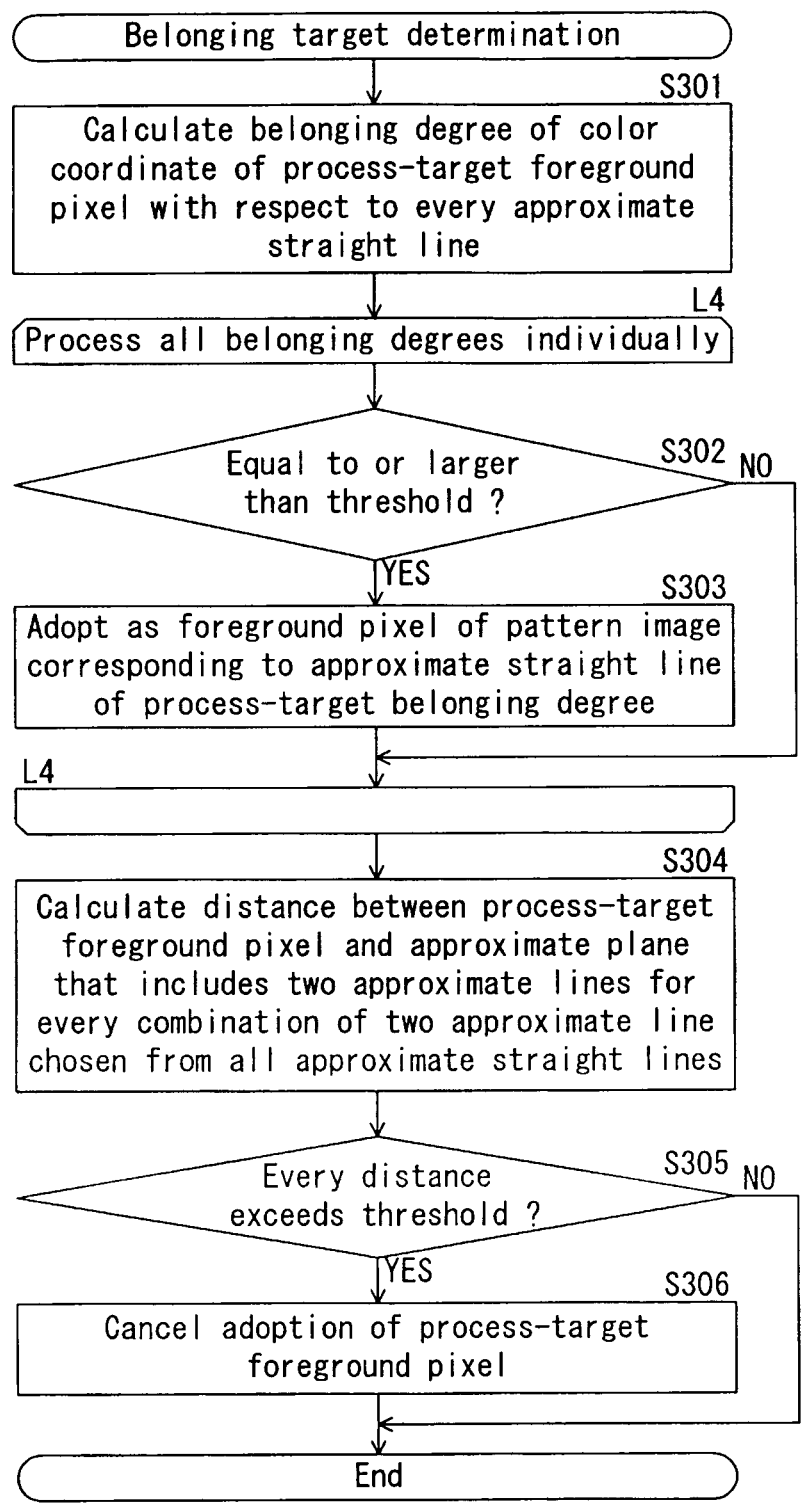
Figure 13:
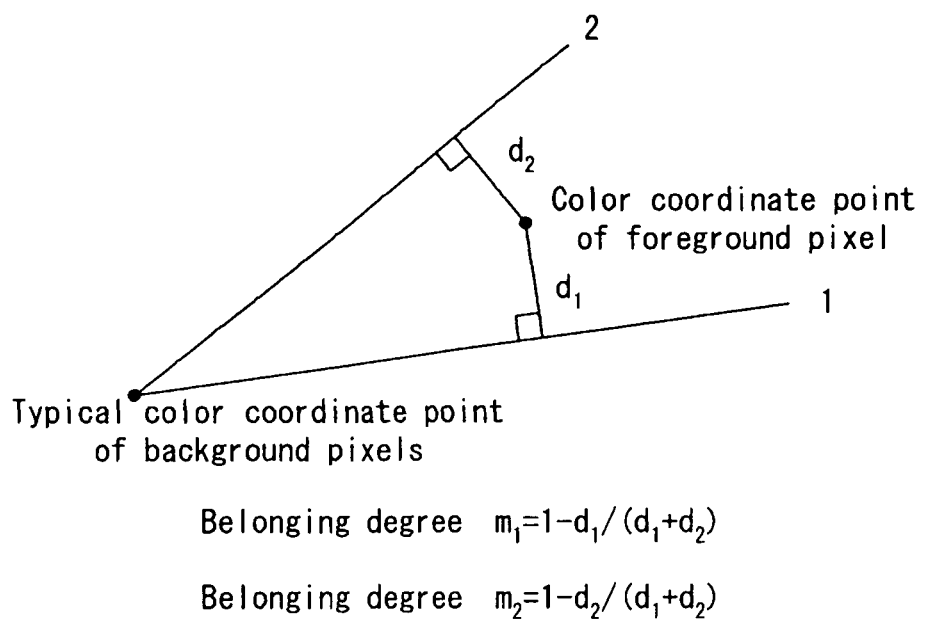
Figure 14A:
Figure 14B:
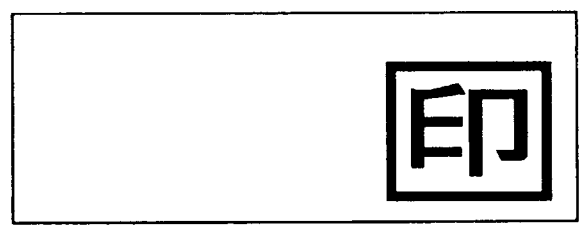
Figure 15:
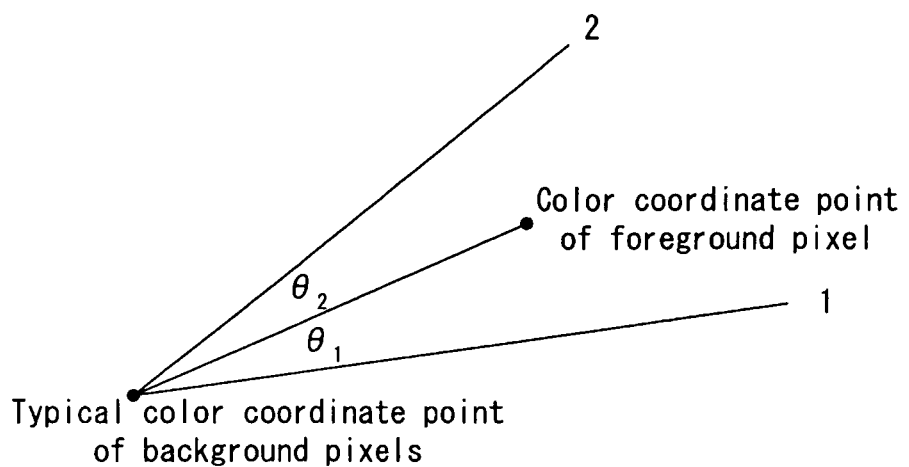

FIG. 1 is a block diagram showing a configuration of the pattern separating extraction device according to an embodiment of the present invention, FIG. 2 shows an example of a document image based on document image data, FIG. 3 is a flowchart showing a pattern separating extraction process, FIG. 4 shows a selection method of a color sample, FIG. 5 is a flowchart showing a foreground color distribution approximate straight line specification subroutine, FIG. 6 is a conceptual view of a unit sphere of which spherical surface is divided into a predetermined number of unit areas, FIG. 7 shows an example of a data structure of a first work table, FIG. 8 shows an example of a data structure of a second work table, FIG. 9A shows a color distribution of foreground pixels of a first color sample, FIG. 9B shows a color distribution of foreground pixels of a second color sample, FIG. 10 shows a relationship between a unit sphere that is centered on a coordinate of background typical color and an approximate straight line, FIG. 11 is a flowchart showing a belonging target determination subroutine, FIG. 12 shows an example of a data structure of a third work table, FIG. 13 shows a calculation method of a belonging degree, FIG. 14A shows an image that consists of a first print pattern only, FIG. 14B shows an image that consists of a second print pattern only, and FIG. 15 shows a modification of the calculation method of the belonging degree.

DESCRIPTION OF THE PREFERRED EMBODIMENTS

Hereafter, an embodiment of the present invention will be described with reference to the accompanying drawings.

First, a hardware configuration and a software configuration of the computer network system according to the embodiment will be described.

FIG. 1 is a block diagram showing a configuration of the pattern separating extraction device of the embodiment.

The pattern separating extraction device 10 of the embodiment is a personal computer to which a pattern separating extraction function is added. Therefore, the pattern separating extraction device 10 consists of a display device 10a such as a liquid crystal display, an input device 10b such as a keyboard and a mouse, and a main body to which these devices 10a and 10b are connected. The main body contains a storage device 10c, a CPU (Central Processing Unit) 10d, and a DRAM (Dynamic Random Access Memory) 10e.

The storage device 10c stores various kinds of application programs and data. The CPU 10d is a processing unit that processes according to a program within the storage device. The DRAM 10e is a volatile storage device to which a program is cashed and workspace is developed when the CPU 10d processes.

Document image data 11 and pattern separating extraction tool software 12 are installed into the storage device 10c of the pattern separating extraction device 10. FIG. 1 shows a condition where the document image data 11 and the pattern separating extraction tool software 12 are developed onto the DRAM 10e.

The document image data 11 is data for displaying a document image, and it is generated by digitizing contents of the document by a scanner. A document is a piece of paper on which some entry columns are formed by ruled lines according to a predetermined format. Characters and symbols fill in the entry columns by handwriting or printing, or seals are imprinted therein. A pattern such as a handwriting character, a carbon copy character, or an imprint of a seal that is added to a document by a person is called a post print pattern. A pattern such as a ruled line, a character, or a symbol that is printed on a document before a person adds a post print pattern is called a pre-print pattern.

FIG. 2 shows an example of a document image based on the document image data 11.

As shown in FIG. 2, in the embodiment, the document image contains a plurality of print patterns that consist of one post print pattern, and one or more post print patterns and/or a pre-print pattern. These patterns overlap mutually. Specifically, the document image contains a first print pattern that consists of four printed kanji characters, and a second print pattern that is an imprint of a seal consisting of a rectangular frame and a kanji character within the frame. The kanji characters of the first print pattern mean a name "Taro Yamada". The kanji character of the second print pattern means a "seal". The second print pattern is arranged so that the upper half of the second print pattern overlaps the last kanji character of the first print pattern.

The pattern-separating-extraction tool software 12 of FIG. 1 generates an image that consists of only one print pattern for each print pattern based on the document image as shown in FIG. 2. The contents of the process that is executed by the CPU 10d according to the pattern separating extraction tool software 12 will be described below.

Next, the flow of the process executed by the pattern separating extraction device 10 of the embodiment will be described.

When an operator inputs a predetermined operation through the input device 10b, the CPU 10d starts the pattern-separating-extraction tool software 12. Then, a pattern separating extraction process is started in the pattern separating extraction device 10.

FIG. 3 is a flowchart showing a pattern separating extraction process.

In the first step S101 of the pattern separating extraction process, the CPU 10d accepts a designation of any one piece of the document image data 11 in the storage device 10c from the operator through the input device 10b.

In the next step S102, the CPU 10d displays the document image based on the document image data 11 specified by the designation accepted in step S101 on the display device 10a. The step S102 corresponds to the displaying function mentioned above, and the CPU 10d that executes step S102 corresponds to a displaying section. Then, the CPU 10d advances the process to step S103.

In step S103, the CPU 10d accepts a designation for choosing a dragged section in the document image displayed on the display device 10a as a color sample from the operator through the input device 10b. At this time, the operator has to choose a section so that the section chosen from the document image contains a ground color and only one color other than the ground color.

FIG. 4 shows a method for choosing the color sample.

As shown in FIG. 4, since the second print pattern does not overlap the first character of the first print pattern, the operator chooses the section including the first character as a first color sample 11a. Accordingly, the first color sample 11a includes only the ground color and the color of the character of the first print pattern. Then, the operator chooses the lower half section of the second print pattern that does not overlap the last character of the first print pattern as a second color sample 11b. Accordingly, the second print pattern includes only the ground color and the color of the imprint of the seal of the second print pattern.

In the next step S104, the CPU 10d cuts the section specified by the designation accepted in step S103 from the document image data 11, and stores it as color sample data into the DRAM 12.

In the next step S105, the CPU 10d determines whether the operator directed to finish the designation of the color sample. And when the operator did not direct to finish the designation of the color sample, the CPU 10d branches the process from step S105, and returns the process to step S103. On the other hand, when the operator directed to finish the designation of the color sample, the CPU 10d executes a first process loop L1. The steps S103 through S105 correspond to the acceptance function mentioned above, and the CPU 10d that executes steps S103 through S105 corresponds to an acceptance section.

In the first process loop L1, the CPU 10d executes the step S106 for each of the color samples that are specified by the designations accepted in step S103 in turn.

In step S106, the CPU 10d executes a foreground color distribution approximate straight line specification subroutine.

FIG. 5 is a flowchart showing a foreground color distribution approximate straight line specification subroutine, In the first step S201 of the foreground color distribution approximate straight line specification subroutine, the CPU 10d binarizes the brightness level of each pixel of the color sample of a process target with a predetermined threshold, and generates a binary picture.

In the next step S202, the CPU 10d divides the pixels of the binary picture generated in step S201 into the group of the pixels whose binary brightness levels are "1" as foreground pixels and the group of the pixels whose binary brightness levels are "0" as background pixels.

In the next step S203, the CPU 10d specifies a component value of a background typical color by calculating an average of the color components of all the background pixels in the document image.

In the next step S204, the CPU 10d plots the coordinate point of the background typical color specified in step S203 in a color space coordinate system such as the CIE 1931 standard colorimetric system, and sets up a unit sphere that is centered on the coordinate point.

In the next step S205, the CPU 10d divides the spherical surface of the unit sphere set up at step S204 into a predetermined number of unit areas.

FIG. 6 is a conceptual view of the unit sphere of which spherical surface is divided into the predetermined number of unit areas.

As shown in FIG. 6, the unit sphere is equally divided into a plurality of unit areas (unit surfaces) by the polyhedron approximate. An area number is assigned to each unit area for identifying them individually. Further, location information that specifies a location of each unit area is generated. The location information is defined by coordinates of the vertices of the unit area, or a barycentric coordinate thereof. The area number and the location information are generated when the unit area is set up on the unit sphere, and are managed in a first work table.

FIG. 7 shows an example of a data structure of the first work table.

As shown in FIG. 7, the first work table has records as many as the unit areas that are set up on the unit sphere. Each record has fields of an "area number", "location information", and a "frequency". The "area number" field stores the area number of the unit area. The "location information" field stores the location information of the unit area. The "frequency" field stores the number of the straight lines that pass through the unit area among the straight lines that connect the coordinate points of the colors of the process-target foreground pixels and the center of the unit sphere.

At the time of step S205, the "frequency" field of each record in the first work table is initialized to zero.

The CPU 10d sets up the unit areas on the unit sphere as shown in FIG. 6, and generates the first work table as shown in FIG. 7 on the DRAM 10e. Then, the CPU 10d executes a third process loop L3 of FIG. 5.

In the third process loop L3, the CPU 10d executes steps S206 and S207 for every foreground pixel of the process-target color sample in turn.

In step S206, the CPU 10d specifies the unit area through which the straight line that connects the coordinate point of the color of the process-target foreground pixel and the center of the above-mentioned unit sphere passes in the color space coordinate system.

In the next step S207, the CPU 10d increment the value in the "frequency" field of the record corresponding to the unit area specified in step S206 in the first work table of FIG. 7.

Thus, when the CPU 10d executes steps S206 and S207 about all the foreground pixels of the process-target color sample, the number of the straight lines that pass through a unit area can be counted for each unit area that is set up on the unit sphere in step S205.

After executing the third process loop L3, in the next step S208, the CPU 10d specifies the record whose value in the "frequency" field is the maximum in the first work table of FIG. 7.

In the next step S209, the CPU 10d specifies the straight line that connects the centers of the unit sphere and the unit area based on the center coordinate of the unit sphere that is set up in step S204 and the value in the "location information" field of the record that is specified in step S208. Specifically, the straight line is specified by determining the direction vector of the straight line and the center coordinate of the unit sphere. The CPU 10d calculates $(X_g-X_o, Y_g-Y_o, Z_g-Z_o)$ to specify the direction vector, where the barycentric coordinate of the specified unit area is $(X_g, Y_g, Z_g)$ and the center coordinate of the unit sphere is $(X_o, Y_o, Z_o)$. The CPU 10d uses the straight line defined by the specified direction vector and the center coordinate of unit sphere as an approximate straight line of a distribution of the colors of all the foreground pixels of the process-target color sample since then. Specifying the approximate straight line about the distribution of all the foreground pixels of the process-target color sample, the CPU 10d stores the direction vector of the approximate straight line and the center coordinate of the unit sphere into a second work table.

FIG. 8 shows an example of a data structure of the second work table.

As shown in FIG. 8, the second work table has records as many as the color samples. Each record has fields of a "sample", a "direction vector", and a "center coordinate of unit sphere". The "sample" field stores a color sample number that is used to identify the color sample accepted in step S103. The "direction vector" field stores the direction vector, which is calculated in step S209, about the color sample concerned. The "center coordinate of unit sphere" field stores the center coordinate of the unit sphere that is set up in step S204.

After recording the direction vector of the straight line specified in step S209 and the center coordinate of the unit sphere into the second work table as shown in FIG. 8, the CPU 10d finishes the foreground color distribution approximate straight line specification subroutine of FIG. 5, and finishes the first process loop L1 in FIG. 3 for the process-target color sample concerned.

When the CPU 10d executes step S106 of FIG. 3 (the foreground color distribution approximate straight line specification subroutine of FIG. 5) for all the color samples specified by the designations accepted in step S103, the approximate straight lines on the color space coordinate system are specified for the color samples, respectively, and the records corresponding to the color samples are stored into the second work table of FIG. 8.

Here, a detail of an approximate straight line will be described. When contents such as characters, patterns, and imprints of seals printed on paper are digitized as digital images, colors of the pixels that represent a background (paper itself) and a solidly filled area are distributed in the Gaussian distribution. On the other hand, colors of the pixels that represent line patterns such as characters and imprints of seals are distributed in the linear distribution whose one endpoint is coincident with the center of color distribution of the background due to unevenness of ink, etc. This phenomenon was reported by L. Todoran and M. Worring in the International Conference on Document Analysis and Recognition (IC-DAR) in 1999. An approximate straight line is obtained by approximating the linear color distribution of the line pattern.

FIG. 9A and FIG. 9B show the color distribution of the foreground pixels of the first color sample 11a of FIG. 4 and that of the second color sample 11b, respectively.

As shown by the coordinate points of light gray in FIGS. 9A and 9B, the coordinate points of the colors of the pixels that represent the background in the image (background pixels) show a massive distribution without directivity. On the other hand, as shown by the coordinate points of dark gray in FIGS. 9A and 9B, the coordinate points of the colors of the pixels that represent the line pattern such as a character and an imprint (foreground pixels) show a linear distribution whose one endpoint is coincident with the center of the massive distribution. In the color distributions shown in FIGS. 9A and 9B, the straight lines that are obtained by approximating the color distributions of the pixels that represent the line pattern (foreground pixels) are shown.

FIG. 10 shows a relationship between the unit sphere that is centered on the coordinate of background typical color and the approximate straight line, As shown in FIG. 10, one endpoint of the approximate straight line is coincident with the center of the unit sphere, and the approximate straight line passes through the vertex of a distribution that is formed by projecting the color coordinate of the pixels onto the spherical surface of the unit sphere. Above mentioned steps S204 through S208 of FIG. 5 specify the vertex of the distribution that is formed by projecting the color coordinate of the pixels onto the spherical surface. In this embodiment, the approximate straight lines are specified based on the distribution that is formed by the projection onto the spherical surface. However, the approximate straight lines can be also specified based on the least square method.

After executing the first process loop L1 and acquiring the approximate straight lines about the respective color samples, the CPU 10d advances the process to step S107 of FIG. 3. The first process loop L1 corresponds to the approximate straight line specification function mentioned above, and the CPU 10d that executes the first process loop L1 corresponds to an approximate straight line specification section.

In step S107, the CPU 10d generates a binary picture by binarizing the brightness levels of the pixels of the document image using a predetermined threshold.

In the next step S108, the CPU 10d extracts the group of the pixels whose binary brightness levels are "1" as foreground pixels from the pixels of the binary picture generated in step S107. Then, the CPU 10d executes the second process loop L2.

In the second process loop L2, the CPU 10d repeatedly executes step S109 for every foreground pixel in the document image, in turn.

In step S109, the CPU 10d executes a belonging target determination subroutine.

FIG. 11 is a flowchart showing the belonging target determination subroutine.

In the first step S301 of the belonging target determination subroutine, the CPU 10d calculates distances from the process-target foreground pixel to the approximate straight lines specified in step S106, and records the calculated distances into a third work table as belonging degrees described below.

FIG. 12 shows an example of a data structure of the third work table.

As shown in FIG. 2, the third work table has records as many as the foreground pixels. Each record has fields of a "foreground pixel number", a "coordinate", a "belonging degree", "belonging", and a "distance to proximate plane". The "foreground pixel number" field stores the foreground pixel number that is used for identifying the foreground pixel individually out of the respective foreground pixels. The "coordinate" field stores the coordinate of the foreground pixel in the color space coordinate system. The "belonging degree" field stores the combination of the belonging degrees (described below) to each print pattern about the foreground pixel. The "belonging" field stores the number of the color sample corresponding to the print pattern to which the foreground pixel belongs. The "distance to proximate plane" field stores the distance between the proximate plane containing two approximate straight lines and the foreground pixel concerned. There are the proximate planes as many as the combinations of two approximate straight lines chosen from all the approximate lines. The "distance to proximate plane" field stores the distances as many as the combinations.

At the time of executing step S301, the "belonging" field of the record corresponding to the process-target foreground pixel in the third work table is a blank.

FIG. 13 shows a method for calculating the belonging degree.

FIG. 13 shows an example where two approximate straight lines are extended from the coordinate point of the typical color of the background pixels (from the center of the above-mentioned unit sphere). Usually, the coordinate points of the colors of foreground pixels are distributed around the approximate lines or there between. When a coordinate point of a foreground pixel is located between two approximate straight lines, and assuming that a distance between the coordinate point of the foreground pixel and the first approximate straight line is $d_1$ and a distance between the coordinate point and the second approximate straight line is $d_2$, the belonging degree $m_1$ of the foreground pixel with respect to the first print pattern of which color coordinate points are distributed near the first approximate straight line is expressed as $1-\{d_1/(d_1+d_2)\}$.

Similarly, the belonging degree $m_2$ of the foreground pixel to the second print pattern of which color coordinate points are distributed near the second approximate straight line is expressed as $1-\{d_2/(d_1+d_2)\}$. As is evidence from the equations, the belonging degrees fall within the range of 0 through 1.

More generally, the belonging degree m of a certain pixel to a print pattern corresponding to an i-th approximate straight line is expressed by $$m=1-(d_i/\Sigma d_i)$$

where $d_i$ ($1 \leq i \leq N$) is a distance between an i-th approximate straight line and the coordinate of the color of the pixel, and N is the total number of the approximate straight lines.

Calculating such belonging degrees $m_1$ and $m_2$ for each of the approximate lines, the CPU 10*d* stores the combinations of the belonging degrees into the "belonging degree" field of the record corresponding to the process-target foreground pixel in the third table of FIG. 12. Then, the CPU 10*d* executes a fourth process loop L4 of FIG. 11. The step S301 corresponds to the belonging degree calculation function mentioned above, and the CPU 10*d* that executes step S302 corresponds to a belonging degree calculation section.

In the fourth process loop L4, the CPU 10*d* executes steps S302 and S303 for every belonging degree calculated for the process-target foreground pixel in step S301.

In step S302, the CPU 10*d* determines whether the belonging degree of the process target exceeds a predetermined threshold. The predetermined threshold is 0.3, for example. When the belonging degree of the process target is less than the predetermined threshold, the CPU 10*d* branches the process from step S302, and finishes the process in the fourth process loop L4 with respect to the belonging degree of the process target. On the other hand, when the belonging degree of the process target is equal to or larger than the predetermined threshold, the CPU 10*d* advances the process to step S303.

In step S303, the CPU 10*d* adopts the process-target foreground pixel as a foreground pixel of the pattern image corresponding to the approximate straight line of the process-target belonging degree. That is, the CPU 10*d* additionally registers the number of the color sample corresponding to the print pattern into the "belonging" field of the record of the process-target foreground pixel in the third work table of FIG. 12. Accordingly, when generating the data of the image that consists of the print pattern only, the process-target foreground pixel is adopted as a pixel that constitutes the image. Then, the CPU 10*d* finishes the process in the fourth process loop L4 with respect to the belonging degree of the process target.

Since the CPU 10*d* executes the process of steps S303 and S304 for every belonging degree calculated in step S301, one or more print pattern to which the process-target foreground pixel belongs is determined.

After executing the fourth process loop L4, the CPU 10*d* advances the process to step S304.

In step S304, the CPU 10*d* calculates the distance between the proximate plane containing two approximate straight lines and the process-target foreground pixel. The distance is calculated for each of combinations of two approximate straight lines chosen from all the approximate lines specified in step S106. Then, the CPU 10*d* records all the calculated distances to the "distance to proximate plane" field of the records of the process-target foreground pixel in the third work table of FIG. 12.

In the next step S305, the CPU 10*d* determines whether all the distances calculated in step S304 exceed a predetermined threshold.

When all the distances calculated in step S304 exceed the predetermined threshold, the CPU 10*d* advances the process to step S306.

In step S306, the CPU 10*d* cancels adoption of the process-target foreground pixel to a foreground pixel of the print pattern in step S303. That is, the CPU 10*d* deletes all the values from the "imputed" field of the record of the process-target foreground pixel in the third work table of FIG. 12, and makes the field be blank.

Thus, if all the distances to the respective approximate planes exceed the threshold, the process-target foreground pixel is regarded as noise and is no longer adopted to any print patterns.

After execution of the step S306, the CPU 10*d* finishes the belonging target determination subroutine concerning FIG. 11, and finishes the process in the second process loop L2 of FIG. 3 with respect to the process-target foreground pixel.

On the other hand, when at least one distance calculated in step S304 is less than the predetermined threshold in step S305, the CPU 10*d* branches the process from step S305, and finishes the belonging target determination subroutine concerning FIG. 11 without executing step S306. Then, the CPU 10*d* finishes the process in the second process loop L2 of FIG. 3 with respect to the process-target foreground pixel.

Since the CPU 10*d* executes the process of steps S109 of FIG. 3 (the belonging target determination subroutine of FIG. 11) for every foreground pixel in the document image, one or more print pattern to which the process-target foreground pixel belongs is determined. The fourth process loop L4 corresponds to the belonging-target determination function mentioned above, and the CPU 10*d* that executes the fourth process loop L4 corresponds to a belonging target determination section.

After execution of the second process loop L2, in the next step S110, the CPU 10*d* generates the data of the image containing the foreground pixels that belong to the print pattern for each of print patterns in the document image based on the third work table of FIG. 12. Accordingly, the image data that consists of one print pattern is generated for each print pattern. The step S110 corresponds to the generation function mentioned above, and the CPU 10*d* that executes step S110 corresponds to a generation section.

In the next step S111, the CPU 10*d* outputs the print pattern image data generated in step S110. The data is outputted to a disk device, the display device 10*a*, an OCR (Optical Character Reader), another computer on a network, etc. Outputting the print pattern image data, the CPU 10*d* finishes the process concerning FIG. 3. The step S11 corresponds to the output functions mentioned above, and the CPU 10*d* that executes step S111 corresponds to an output section.

Next, the operations and effects of the pattern separating extraction device 10 of the embodiment will be described.

When the operator of the pattern separating extraction device 10 starts the pattern separation extraction tool 12 through the input device 10*b*, an input screen is displayed on the display device 10*a*, for example. The operator can choose and designate any one of document image data within the storage device 10*c* through the input screen (step S101).

Then, the document image that is chosen by the operator is displayed on the display device 10*a* (step S102). The operator can choose and designate a color sample by a drag operation on the document image that is displayed on the display device 10a (step S103). And if the operator inputs the designation to finish the designation of a color sample through the input device 10b after designating some color samples, the pattern separating extraction device 10 generates and outputs the image data that consists of one print pattern for each of the print patterns included in the document image chosen by the operator.

FIG. 14A shows one example of the first print pattern image, and FIG. 14B shows one example of the second print pattern image.

As shown in FIGS. 14A and 14B, the first print pattern and the second print pattern, which are contained in the document image of FIG. 2 under the overlapped condition, are separately taken out and are shown as independent images.

When generating the image data about the respective print patterns, the computer treats a pixel in a document image that has high belonging degrees for a plurality of print patterns as a pixel that constitutes these print patterns (step S303). That is, a pixel of a document image may constitute not only one print pattern, but also a plurality of print patterns in some cases.

For example, when a threshold is 0.3, the foreground pixel whose combination of the belonging degrees to the first and second print patterns is (0.1, 0.9) belongs to the second print pattern only. However, if the combination is (0.45, 0.55), the foreground pixel concerned belongs to both of the first print pattern and the second print pattern. Accordingly, each of the print pattern images generated can be used as a target of the character recognition process by the OCR without an influence of a lack of a pixel having high belonging degree, etc.

In this embodiment, the common threshold is used to determine the belonging degree for any approximate straight lines. However, the scope of the invention it is not limited to this. For example, the threshold may be changed corresponding to the approximate straight lines.

In this embodiment, as shown in FIG. 13, the belonging degree is calculated based on the distances d1 and d2 between the coordinate point of the foreground pixel and the respective approximate straight lines. However, the scope of the invention is not limited to this. For example, as shown in FIG. 15, the belonging degrees $m_1$ and $m_2$ can be calculated based on the interior angles θ1 and θ2 that are formed between the straight line, which connects the coordinate point of the foreground pixel and the coordinate point of the typical color of the background pixels, and the respective approximate straight lines.

That is, the belonging degree $m_1$ is expressed as $1-\{\theta_1/(\theta_1+\theta_2)\}$, and the belonging degree $m_2$ is expressed as $1-\{\theta_2/(\theta_1+\theta_2)\}$.

More generally, the belonging degree m of a certain pixel to a print pattern corresponding to an i-th approximate straight line is expressed by $$m=1-(\theta_i/\Sigma\theta_i),$$

where $\theta_i$ (1≤i≤N) is an interior angle formed between an i-th approximate straight line and a straight line connecting the coordinate of the background color and the coordinate of the color of the pixel, and N is the total number of the approximate straight lines.

What is claimed is:

1. A pattern separating extraction device comprising:
a displaying section to display a document image that includes a plurality of print patterns that include a section that has a background color and a color of one of pre-print patterns of the plurality of print patterns or a section that has the background color and a color of one of post print patterns of the plurality of print patterns;
an acceptance section to accept a section that has the background color and a color of one of the print patterns in the document image displayed by said displaying section as a color sample for each of the print patterns through an input device;
an approximate straight line specification section to specify an approximate straight line of a distribution in a color space about a color other than the background color for each color sample that is specified by each designation accepted by said acceptance section;
a belonging degree calculation section to calculate a belonging degree of each of all the pixels in the document image to each of the print patterns based on a distance between a color of the pixel and each of the approximate straight lines that are specified by said approximate straight line specification section;
a belonging target determination section to determine a print pattern as a belonging target for each of all the pixels in the document image when the belonging degree of the pixel to the print pattern exceeds a predetermined threshold;
a generation section to generate image data of an image that has only one print pattern based on the pixels that belong to the print pattern for each of the print patterns in which the pixels belong thereto are determined by said belonging target determination section; and
an output section to output the image data about the respective print patterns generated by said generation section,
wherein said approximate straight line specification section sets up a unit sphere that is centered on the coordinate point of the background color in said color sample in said color space, equally divides a spherical surface of said unit sphere into predetermined number of unit areas, and wherein said approximate straight line specification section specifies one unit area through which the maximum number of the straight lines connecting the coordinate point of the background color and a coordinate point of a color other than the background color pass, and specifies a straight line connecting said specified unit area and said coordinate point of the background color as the approximate straight line.

2. The pattern separating extraction device according to claim 1, wherein said belonging degree calculation section calculates the belonging degree of a certain pixel to a print pattern corresponding to an i-th approximate straight line by $1-(d_i/\Sigma d_i)$, where $d_i$ (1≤i≤N) is a distance between an i-th approximate straight line and the coordinate of the color of the pixel, and N is the total number of the approximate straight lines.

3. The pattern separating extraction device according to claim 1, wherein said belonging degree calculation section calculates the belonging degree of a certain pixel to a print pattern corresponding to an i-th approximate straight line by $1-(\theta_i/\Sigma\theta_i)$, where $\theta_i$ (1≤i≤N) is an interior angle formed between an i-th approximate straight line and a straight line connecting the coordinate of the background color and the coordinate of the color of the pixel, and N is the total number of the approximate straight lines.

4. The pattern separating extraction device according to claim 1, wherein said belonging target determination section calculates a distance between a certain pixel and an approximate plane that contains two approximate straight lines for every combination of two approximate straight lines chosen from all the approximate straight lines specified by said approximate straight line specification section, and cancels adoption of the certain pixel when all the distances calculated exceed a predetermined threshold, and wherein said belonging target determination section executes said calculation and cancellation for every pixel in the document image.

5. A pattern separating extraction method executed by a computer comprising:
- a displaying procedure to display a document image that includes a plurality of print patterns that include a section that has a background color and a color of one of pre-print patterns of the plurality of print patterns or a section that has the background color and a color of one of post print patterns of the plurality of print patterns;
- an acceptance procedure to accept a section that has the background color and a color of one of the print patterns in the document image displayed by said displaying procedure as a color sample for each of the print patterns through an input device;
- an approximate straight line specification procedure to specify an approximate straight line of a distribution in a color space about a color other than the background color for each color sample that is specified by each designation accepted by said acceptance procedure;
- a belonging degree calculation procedure to calculate a belonging degree of each of all the pixels in the document image to each of the print patterns based on a distance between a color of the pixel and each of the approximate straight lines that are specified by said approximate straight line specification procedure;
- a belonging target determination procedure to determine a print pattern as a belonging target for each of all the pixels in the document image when the belonging degree of the pixel to the print pattern exceeds a predetermined threshold;
- a generation procedure to generate image data of an image that has only one print pattern based on the pixels that belong to the print pattern for each of the print patterns in which the pixels belong thereto are determined by said belonging target determination procedure; and
- an output procedure to output the image data about the respective print patterns generated by said generation procedure,
- wherein said approximate straight line specification procedure sets up a unit sphere that is centered on the coordinate point of the background color in said color sample in said color space, equally divides a spherical surface of said unit sphere into predetermined number of unit areas, and wherein said approximate straight line specification procedure specifies one unit area through which the maximum number of the straight lines connecting the coordinate point of the background color and a coordinate point of a color other than the background color pass, and specifies a straight line connecting said specified unit area and said coordinate point of the background color as the approximate straight line.

6. The pattern separating extraction method according to claim 5, wherein said belonging degree calculation procedure calculates the belonging degree of a certain pixel to a print pattern corresponding to an i-th approximate straight line by $1-(d_i/\Sigma d_i)$, where $d_i$ ($1 \le i \le N$) is a distance between an i-th approximate straight line and the coordinate of the color of the pixel, and N is the total number of the approximate straight lines.

7. The pattern separating extraction method according to claim 5, wherein said belonging degree calculation procedure calculates the belonging degree of a certain pixel to a print pattern corresponding to an i-th approximate straight line by $1-(\theta_i/\Sigma \theta_i)$, where $\theta_i$ ($1 \le i \le N$) is an interior angle formed between an i-th approximate straight line and a straight line connecting the coordinate of the background color and the coordinate of the color of the pixel, and N is the total number of the approximate straight lines.

8. The pattern separating extraction method according to claim 5, wherein said belonging target determination procedure calculates a distance between a certain pixel and an approximate plane that contains two approximate straight lines for every combination of two approximate straight lines chosen from all the approximate straight lines specified by said approximate straight line specification procedure, and cancels adoption of the certain pixel when all the distances calculated exceed a predetermined threshold, and wherein said belonging target determination procedure executes said calculation and cancellation for every pixel in the document image.

* * * * *